Jan. 23, 1962  E. R. PAYNE  3,017,787
MOTOR VEHICLE POWER PLANTS
Filed March 11, 1959

Inventor
Eric Richard Payne

By Scrivener and Parker,
Attorneys

United States Patent Office 3,017,787
Patented Jan. 23, 1962

3,017,787
MOTOR VEHICLE POWER PLANTS
Eric Richard Payne, Northfield, Birmingham, England, assignor to The Austin Motor Company Limited, Birmingham, England
Filed Mar. 11, 1959, Ser. No. 798,756
Claims priority, application Great Britain Mar. 24, 1958
2 Claims. (Cl. 74—701)

This invention relates to power plants for motor vehicles with either front engine and front wheel drive or a rear engine and rear wheel drive, said power plants being of the kind comprising in combination as a unit, or as a unitary assembly, an internal combustion engine, a clutch, a change-speed gear driven by the engine through said clutch and a differential gear which is driven by the change-speed gear and from the output shafts of which the road wheels are driven.

According to the present invention, a power unit or assembly of the kind referred to and adapted to be mounted with the engine crankshaft transversely of the vehicle, comprises in combination an engine with the change-speed gear and the differential gear mounted in the engine crankcase, or a lateral extension thereof, and both to one side of the engine crankshaft, the change-speed gear being disposed between the crankshaft and the differential with the change-speed gear shafts and the axis of the crown-wheel or input shaft of the differential gear all parallel to one another and to the crankshaft, and the power unit or assembly is characterised in that the change-speed gear, instead of having the usual layshaft positively driven through constantly meshing gears from a separate input shaft, has a first motion shaft in the form of a multiple-pinion which is directly driven, through gearing and the clutch, from the engine crankshaft.

Figure 1:
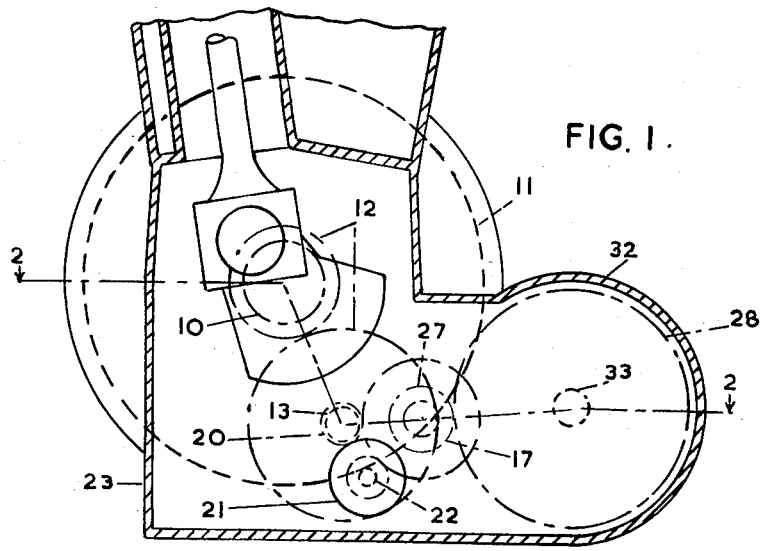
Figure 2:
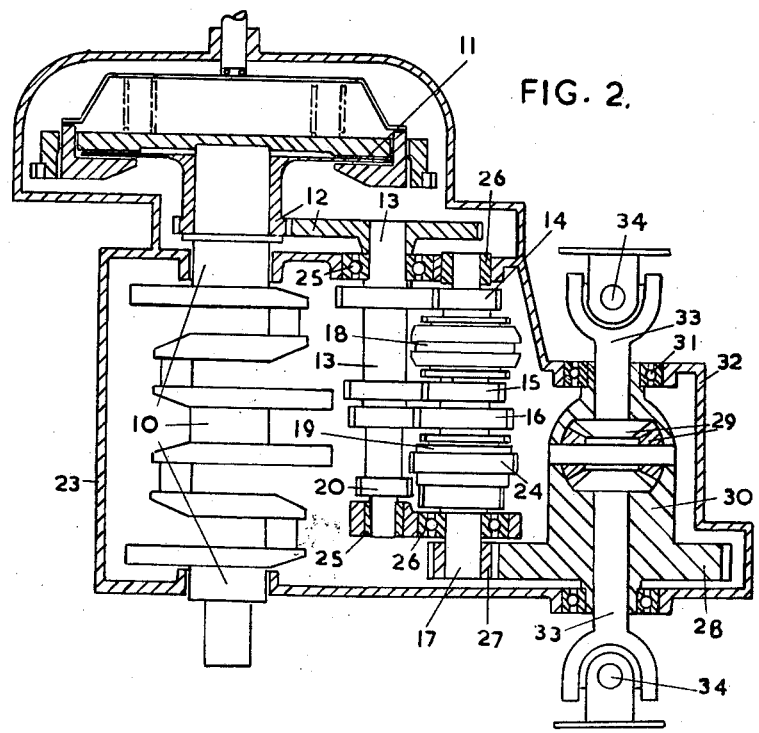

An embodiment of the invention is shown in the accompanying drawings, in which:

FIG. 1 is a fragmentary sectional side elevation of a motor vehicle power plant, and FIG. 2 is a sectional plan taken on the line 2—2 of FIG. 1.

Referring to the drawings, the motor vehicle power plant comprises a four cylinder engine the crankshaft 10 of which, through a clutch 11 and spur gearing 12, directly drives the first motion shaft 13 of a change-speed gear, said first motion shaft 13 being in the form of a multiple pinion having four forward gear pinion elements or portions three of which are in constant mesh with pinions 14, 15 and 16 respectively which are revolubly mounted on the change-speed gear output shaft 17 and are adapted to be selectively coupled thereto by coupling sleeves 18, 19 which are slidably keyed, or splined on the said output shaft 17. For obtaining a drive in reverse and also for first gear, the multiple-pinion first motion shaft 13 has a pinion element 20 constantly in mesh with an intermediate pinion 21 which is slidable upon, or with, an intermediate shaft 22 in the lower part of the engine crankcase 23 for driving engagement with a gear 24 on the coupling sleeve 19 for reverse when the sleeve 19 is in one of its extreme positions, which gear 24 is slidable on splines on the shaft 17 and into mesh with pinion 20 for giving forward drive in first gear.

The multiple-pinion first motion shaft 13 and the output shaft 17 of the change-speed gear are mounted in bearings 25, 26 respectively in the engine crankcase 23, and the said output shaft 17 has fixed thereon at one end an output pinion 27 in constant mesh with the crown wheel 28 of the differential gear 29, the body or planet carrier 30 of which is mounted for rotation, in end bearings 31 in a lateral extension 32 of the crankcase 23, about an axis parallel to that of the change-speed gear output shaft 17. The differential gear output shafts 33 extend through and beyond the said end bearings 31 in the crankcase extension 32 and their outer ends are adapted, by the provision of universal couplings 34 thereon, to be connected to the road wheel axles.

The larger diameter wheel of the gear train 12 is fixed on the input end of the multiple-pinion first motion shaft 13, and the other or smaller gear 12 is mounted for rotation about the corresponding end journal of the engine crankshaft 10 and adapted to be coupled thereto by the clutch 11.

The change-speed gear first motion shaft 13, its output shaft 17 and the differential gear output shafts 33 are all parallel to one another and to the axis of the crankshaft 10 and all to one side of the latter.

It will be seen that in a motor vehicle power plant of the kind referred to and in accordance with the present invention, the usual separate input shaft driven through constantly meshing gears from the engine clutch and driving a multiple-pinion layshaft is dispensed with, and the first motion shaft of the change-speed gear is itself directly driven, through gearing from the engine clutch and takes the form of a multiple-pinion shaft, thereby simplifying the layout and reducing the number of parts.

Having fully described my invention, what I claim and desire to secure by Letters Patent is:

1. A power unit or assembly of the kind referred to and adapted to be mounted with the engine crankshaft transversely of the vehicle, comprising in combination an engine having a change-speed gear and a differential gear both mounted in the engine crankcase, and both to one side of the engine crankshaft, the change-speed gear being disposed between the crankshaft and the differential gear with the axes of the change-speed gear and the axis of the differential gear all parallel to one another and to the crankshaft, said change-speed gear including separate and spaced apart parallel input and output shafts, means for rotating the input shaft from said crankshaft comprising, a driven gear fixed to the input shaft and a driving gear coaxially arranged with respect to said crankshaft and rotatable thereby, said driving and driven gears lying in a common plane normal to the axis of the crankshaft and being positively driveably interconnected, and means for operatively connecting said output shaft to said input shaft to rotate the former solely in response to rotation of the latter to establish a plurality of change speed ratios, said last named means comprising a plurality of driving pinions secured to the input shaft, a plurality of driven pinions rotatably mounted on the output shaft and in constant mesh with the respective driving pinions, and coupling sleeves for selectively coupling the driven pinions with the output shaft, an output pinion fixed to said output shaft, and said differential gear including a planet carrier having its crown wheel in constant mesh with said output pinion.

2. A power unit or assembly as claimed in claim 1, in which, for obtaining a drive in reverse, the said input shaft has a pinion element constantly in mesh with a slidable intermediate pinion for driving engagement with a reversing pinion on the output shaft when one of said coupling sleeves is in one of its extreme positions.

References Cited in the file of this patent
UNITED STATES PATENTS

| | | |
|---|---|---|
| 1,856,284 | Lavoie | May 3, 1932 |
| 2,306,545 | Kummich | Dec. 29, 1942 |
| 2,913,927 | Issigonis | Nov. 24, 1959 |

FOREIGN PATENTS

| | | |
|---|---|---|
| 430,930 | Italy | May 3, 1947 |
| 762,651 | Great Britain | Dec. 5, 1956 |